US011885150B2

(12) United States Patent
Kinnunen et al.

(10) Patent No.: US 11,885,150 B2
(45) Date of Patent: Jan. 30, 2024

(54) DISC TUMBLER CYLINDER LOCK AND KEY COMBINATION

(71) Applicant: ABLOY OY, Joensuu (FI)

(72) Inventors: Keijo Kinnunen, Reijola (FI); Jouni Tirkkonen, Joensuu (FI)

(73) Assignee: ABLOY OY, Joensuu (FI)

( * ) Notice: Subject to any disclaimer, the term of this patent is extended or adjusted under 35 U.S.C. 154(b) by 375 days.

(21) Appl. No.: 17/593,027

(22) PCT Filed: Feb. 28, 2020

(86) PCT No.: PCT/FI2020/050127
§ 371 (c)(1),
(2) Date: Sep. 3, 2021

(87) PCT Pub. No.: WO2020/178478
PCT Pub. Date: Sep. 10, 2020

(65) Prior Publication Data

US 2022/0170293 A1 Jun. 2, 2022

(30) Foreign Application Priority Data

Mar. 5, 2019 (FI) ..................................... 20195157

(51) Int. Cl.
*E05B 29/00* (2006.01)
*E05B 15/06* (2006.01)
(Continued)

(52) U.S. Cl.
CPC .......... *E05B 29/0013* (2013.01); *E05B 15/06* (2013.01); *E05B 19/0052* (2013.01); *E05B 21/066* (2013.01)

(58) Field of Classification Search
CPC ...... E05B 15/06; E05B 15/08; E05B 19/0017; E05B 19/0023; E05B 19/0035;
(Continued)

(56) References Cited

U.S. PATENT DOCUMENTS 4,686,843 A 8/1987 Martikainen et al.
5,372,024 A * 12/1994 Ruckert .............. E05B 19/0035 70/401
(Continued)

FOREIGN PATENT DOCUMENTS

CN 1464935 A 12/2003
CN 105658885 A 6/2016
(Continued)

OTHER PUBLICATIONS

Written Opinion and Search Report issued in corresponding International application No. PCT/FI2020/050127 dated May 11, 2020 (9 pages).

*Primary Examiner* — Christopher J Boswell
(74) *Attorney, Agent, or Firm* — Muncy, Geissler, Olds & Lowe, P.C.

(57) ABSTRACT

A combination of a disc tumbler cylinder lock and a key. The disc tumbler cylinder lock includes rotation limiting device for the key and a guiding element. The key includes grooves for the guiding element, which has two rails making up some of said rotation limiting device, and both of the rails include at least one limiter protrusion arranged to facing inward in the disc tumbler cylinder lock. The key includes at least one recess for the limiter protrusions. The rotation limiting device further includes a front guide having the rails in association therewith. The front guide and the rails are arranged to allow the key, which is in a basic position in the disc tumbler cylinder lock, to be turned for releasing the locking of the disc tumbler cylinder lock.

23 Claims, 7 Drawing Sheets

(51) Int. Cl.
*E05B 19/00* (2006.01)
*E05B 21/06* (2006.01)

(58) Field of Classification Search
CPC ............. E05B 19/0041; E05B 19/0052; E05B 21/066; E05B 29/0013
See application file for complete search history.

(56) References Cited

U.S. PATENT DOCUMENTS

| | | | | |
|---|---|---|---|---|
| 5,490,405 | A * | 2/1996 | Ramo | E05B 21/066 70/366 |
| 5,934,121 | A * | 8/1999 | Chen | E05B 21/066 70/377 |
| 6,799,447 | B2 * | 10/2004 | Mielonen | E05B 21/066 70/366 |
| 8,485,006 | B2 * | 7/2013 | Kiiski | E05B 21/066 70/389 |
| 8,689,595 | B2 * | 4/2014 | Martikainen | E05B 19/0017 70/377 |
| 9,447,605 | B1 * | 9/2016 | Clifford | E05B 19/0052 |
| 9,447,607 | B2 * | 9/2016 | Malinen | E05B 21/066 |
| 10,240,364 | B2 * | 3/2019 | Wehr | E05B 21/066 |
| 2012/0260703 | A1 * | 10/2012 | Kiiski | E05B 21/066 70/365 |

FOREIGN PATENT DOCUMENTS

| | | | |
|---|---|---|---|
| EP | 0989262 | A2 | 3/2000 |
| EP | 2453084 | A2 | 5/2012 |
| FI | 94452 | B | 5/1995 |
| FI | 108308 | B | 12/2001 |
| GB | 2361505 | B | 3/2002 |
| WO | WO2011080384 | A1 | 7/2011 |
| WO | WO2014072570 | A1 | 5/2014 |
| WO | WO-2015/059723 | A1 | 4/2015 |
| WO | WO-2016075363 | A1 | 5/2016 |

* cited by examiner

DISC TUMBLER CYLINDER LOCK AND KEY COMBINATION

BACKGROUND OF THE INVENTION

Field of the Invention

This invention relates to a disc tumbler cylinder lock and key combination. Specifically, the invention relates to a combination, in which the disc tumbler cylinder lock is provided with a rotation limiter.

Brief Description of the Related Art

Disc tumbler lock cylinders make use of tumbler discs for clearing a key-specific code and for releasing the locking. The Insertion of a key into a disc tumbler cylinder lock does not yet bring about clearing of the code, but it is only turning of the key that instigates rotation of the tumbler discs according to cut profiles of the key and thereby clearing of the key code. Once the key code is cleared and turning of the key continues, the disc tumbler cylinder lock is unlocked. Namely, the continued turning of the key after clearing a key code brings about rotation of the disc tumbler cylinder lock's rearward end, which can be associated with a locking bar or linked to the locking bar via a lock mechanism.

The rotation limiter is a mechanism which prevents a wrong key, which has been inserted into a disc tumbler cylinder lock, from turning in the disc tumbler cylinder lock, the disc tumblers thereby not rotating essentially out of the basic position. The rotation limiter also prevents the turning of a lock-matching key unless it has been fully inserted into the lock cylinder. In this case, turning of the key may cause rotation of tumbler discs out of a joint basic position of the tumbler discs, even without releasing the lock. The basic position refers to a condition in which a key is insertable into a cylinder lock.

The rotation limiter allows the turning of a correct key in a cylinder lock as long as the key has been fully inserted therein. For example, patent publication FI 108308 discloses a known rotation limiter for a disc tumbler cylinder lock. The rotation limiter comprises a body and a shield. The shield is integrated with an inner cylinder of the disc tumbler cylinder lock. The body is provided in the middle with a key profile opening by way of which the key can be inserted into the cylinder lock. On each side of the key profile opening is a limiter mechanism along the same in line. The limiter mechanism consists of a spring and balls at both ends thereof.

The key matching a disc tumbler cylinder lock has counter-surfaces for the balls of a limiter mechanism. The counter-surfaces are recesses in the key's surface. When a correct key is present in the key cylinder, the key can thereby be turned for displacing the tumbler discs to a correct position for releasing the locking. Hence, the inner cylinder is able to rotate as turning of the key is continued. Thus, the rotation limiter improves operational reliability of the disc tumbler cylinder lock.

The lock can also be provided with a guiding element, placed in a key channel which is established jointly by key openings comprised in the discs as described in FI 108308. The guiding element comprises two rails and a yoke between the rails. The yoke is located at an inner end of the disc tumbler cylinder lock and thus joins the rails fixedly to each other. In other words, the guiding element can be a rail bent in the middle by 180 degrees. The guiding element is conventionally propped on rotation limiting means 11 in such a way that the guiding element is also rotating continuously as the key is turned in the lock. The guiding element controls the insertion and removal of a key into and out of the lock and also functions as a shield against manipulation. In addition, it also contributes for its part to the profile of a lock-matching key.

FI94452 discloses another solution for a rotation limiter, wherein the supporting disc set on the inner cylinder has mounted thereon two limiter discs, which, as the key is turned in the lock, move towards the key and notches made therein.

The prior known disc tumbler cylinder lock solutions provide, as such, a good safeguard against manipulation but it is still desirable to improve protection solutions.

SUMMARY OF THE INVENTION

It is an objective of the invention to improve the qualities of a disc tumbler cylinder lock against manipulation. The objective is attained as presented in the independent claim. Various embodiments of the invention are presented in the dependent claims.

The disc tumbler cylinder lock 100 and key 1 combination according to the invention comprises key rotation limiting means 101 and a guiding element 25, 48, 50 in the disc tumbler cylinder lock 100. The key 1 comprises grooves 5 for the guiding element. The guiding element comprises two rails 25, 48, 50, which make up a portion of the rotation limiting means 101 and each of the rails comprises at least one limiter protrusion 26. The limiter protrusions are arranged to extend inward in the disc tumbler cylinder lock, and the key 1 comprises at least one recess 6 for the limiter protrusions.

The rotation limiting means further comprise a front guide 22, 57, the front guide having the rails 35, 48, 50 in association therewith. The front guide and the rails are arranged to allow turning of the key 1, presently in its basic position in a disc tumbler cylinder lock, for releasing the locking of the disc tumbler cylinder lock, such that the limiter protrusions 26 of both rails move, upon turning the key, into the at least one recess 6 of the key. In other words, the rails 25, 48, 50 and the limiter protrusions thereof reduce the space of a key channel while moving inwards in the disc tumbler cylinder lock. This, in turn, makes manipulation through the key channel considerably more difficult.

BRIEF DESCRIPTION OF THE DRAWINGS

The invention will now be described in more detail with reference to the accompanying drawing figures, in which.

DETAILED DESCRIPTION OF THE PREFERRED EMBODIMENTS

Figure 1:
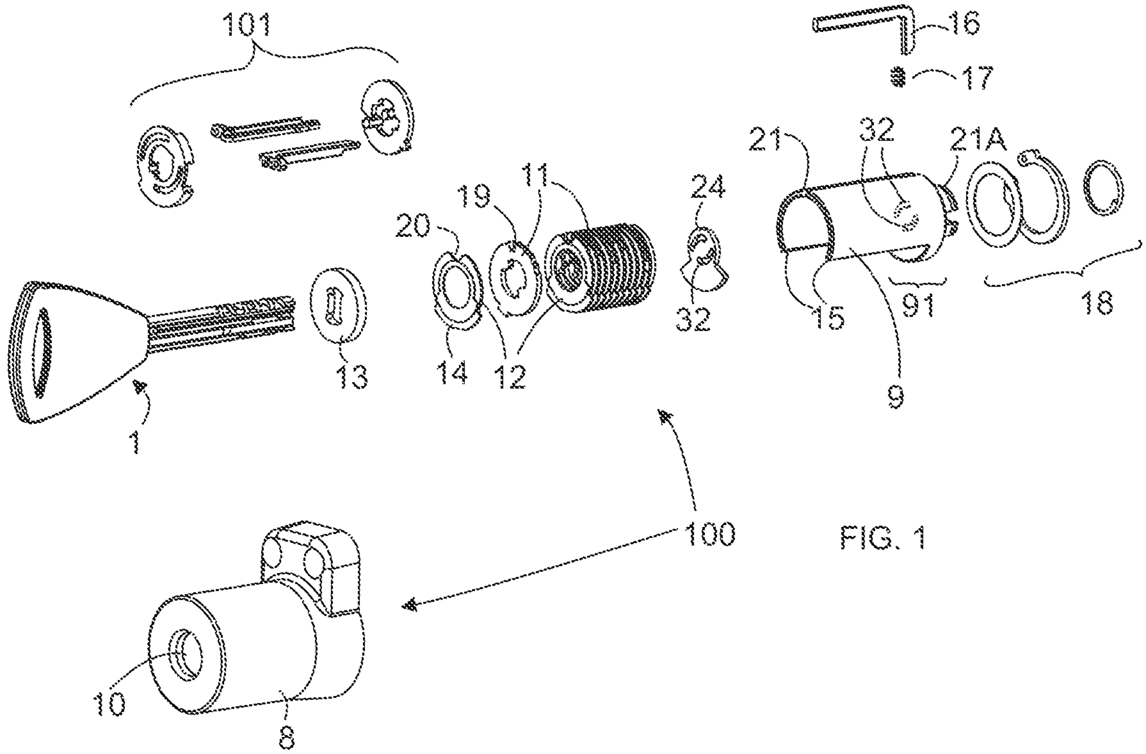
FIG. 1 shows an example of a disc tumbler cylinder lock and a key of the invention.
Figure 2:
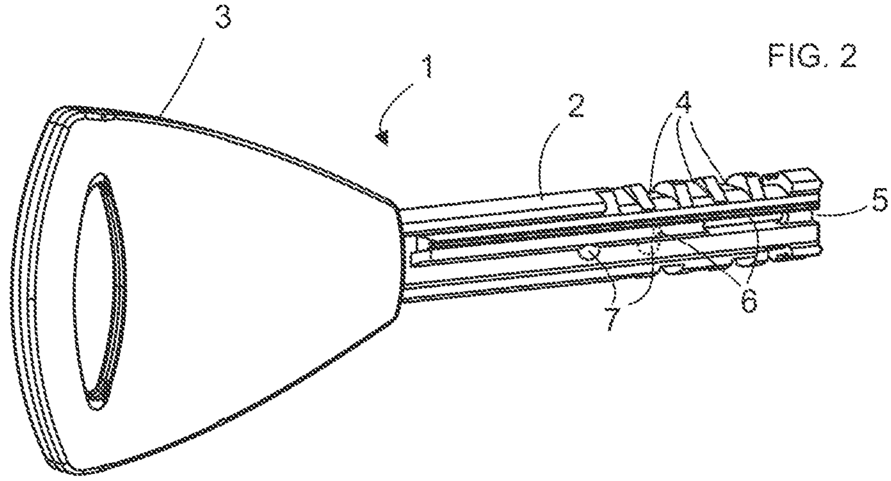
FIG. 2 shows an example for a key of the invention.
Figure 3:
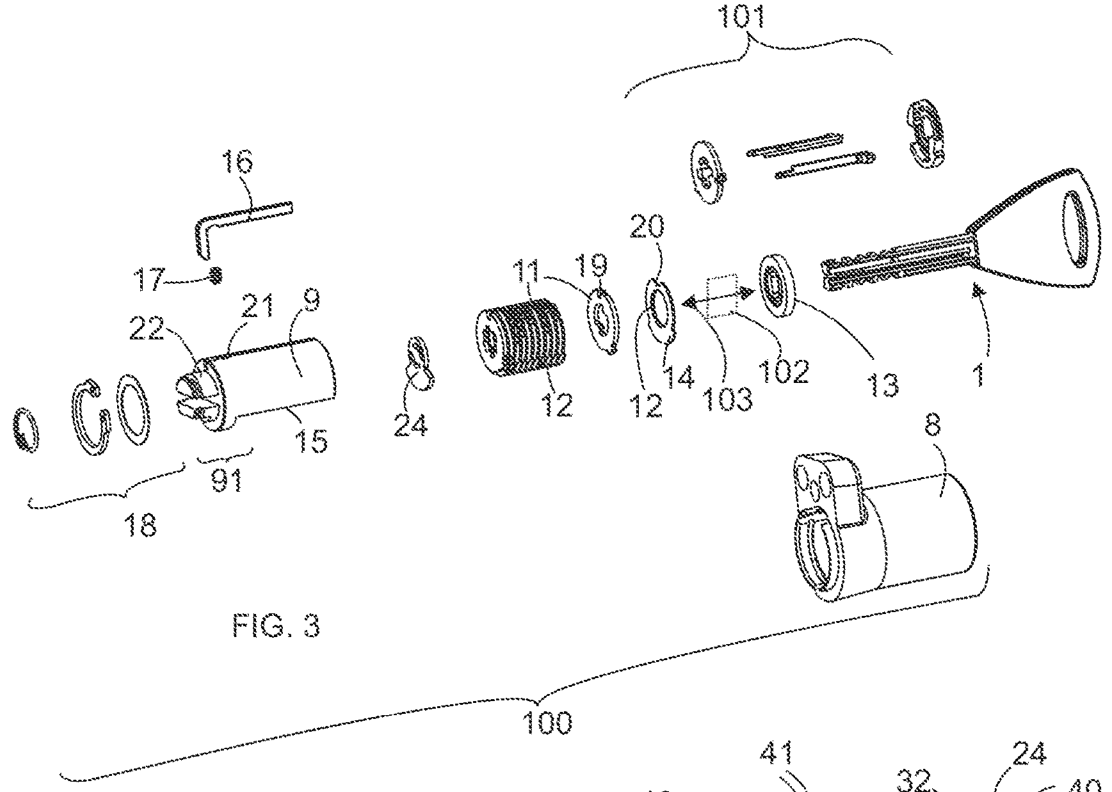
FIG. 3 shows the example of FIG. 1 from another angle.

FIG. 1 shows an example of a disc tumbler cylinder lock 100, as well as its key 1, of the invention in an exploded view. FIG. 2 shows the key 1 in more detail. FIG. 3 shows the example of FIG. 1 from another angle. The disc tumbler cylinder lock comprises a body part 8, on which other parts are assembled as the lock is constructed. The body part has a hole 10 for the key at its forward end. Together with holes in other parts, the hole constitutes a key channel into which the key is to be inserted for unlocking the disc tumbler cylinder lock. As can be seen from FIG. 1, the disc tumblers 11, intermediate discs 12, as well as other possible components such as a drill protection disc 13, comprise holes for the key and the key channel. The disc tumblers and intermediate discs alternate in succession in the disc tumbler lock cylinder. The intermediate discs enable each tumbler disc to be rotatable in such a way that other tumbler discs 11 do not rotate along as a result of friction. The intermediate discs comprise abutting formations 14 placed against an inner structure 9 of the disc tumbler cylinder lock.

FIG. 1 illustrates the inner structure of a disc tumbler cylinder lock, which is an inner cylinder 9, yet it is also possible to construct some other type of inner structure in which, for example, the intermediate discs are connected to each other and to a separate bottom element. For example, WO2016075363 proposes this type of inner structure, which can be modified/applied as an inner structure for the disc tumbler cylinder lock comprised in a combination according to the invention.

In the example of FIG. 1, the inner cylinder 9 has a rearward end 91, which comprises an attachment element 21A for attaching a locking bar or for example a torsion bar to the disc tumbler cylinder lock. In addition, the rearward end and the attachment element are accompanied by other attachment elements 18 such as attachment rings and/or attachment springs. The inner cylinder has a slot 21 for a tumbler pin 16. The tumbler pin prevents turning of the key 1 unless the tumblers have been rotated in such a way that the tumblers' peripheral notches 19 make up a continuous groove with respective notches 20 of the intermediate discs 14. The continuous groove enables an inward movement of the tumbler pin in the disc tumbler cylinder lock and turning of the key after clearing a key-specific code. Inward, in this disclosure, represents a direction towards a central area of the disc tumbler cylinder lock's key channel, the area comprising a center axis 103 (FIG. 3) of the disc tumbler cylinder lock. Outward from the disc tumbler cylinder lock represents an opposite direction, i.e. away from the key channel's central area. A spring 17 ensures operation of the tumbler pin as desired. The example of FIG. 1 has its inner cylinder 9 provided with a cutting, whose cut edges 15 provide a backing for the abutting formations 14 of the intermediate discs 12. The intermediate disc's abutting formation is in this example a sector protrusion 14.

Figure 4:
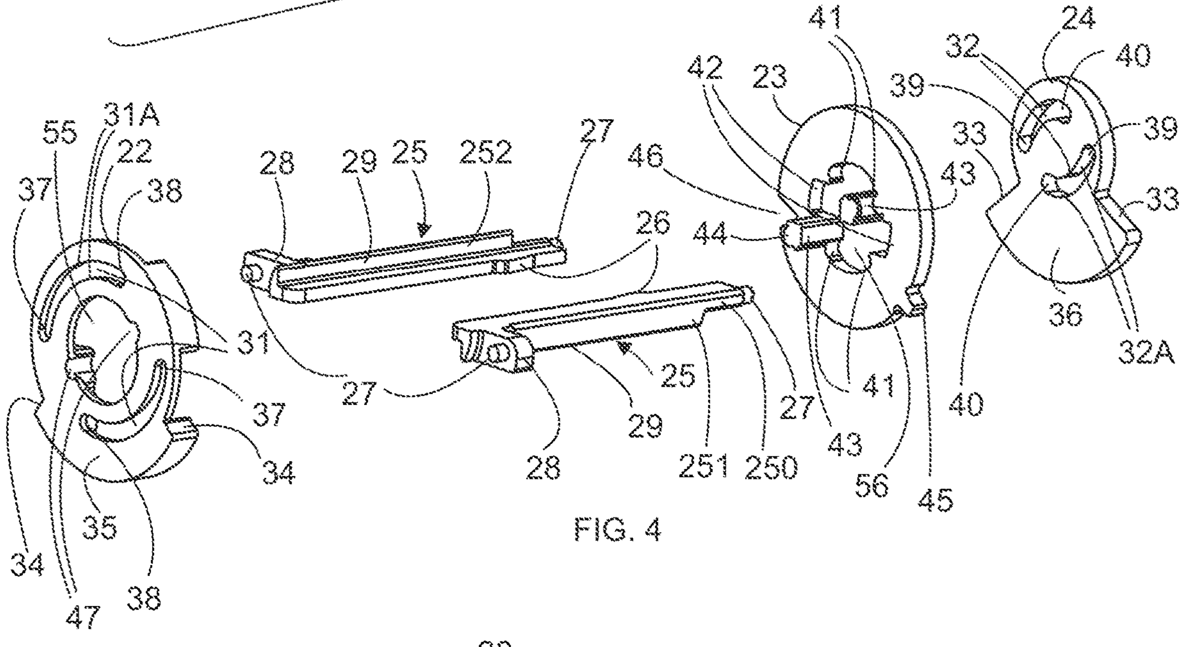
FIG. 4 shows an example of rotation limiting means for a disc tumbler cylinder lock of the invention.

The disc tumbler cylinder lock 100 and key 1 combination according to the invention comprises rotation limiting means 101 for the key and a guiding element 25, 48, 50 in the disc tumbler cylinder lock 100. FIG. 4 illustrates in more detail a composition for the rotation limiting means of the invention. The key 1 comprises grooves 5 for the guiding element. As normal, the key comprises a bow portion 3 and a key shaft 2. The key shaft comprises code cuts 4, constituting a key code by which the key-matching locking of a disc tumbler cylinder lock can be released.

The guiding element comprises two rails 25, 48, 50, which form a part of the rotation limiting means 101 and which are both provided with at least one limiter protrusion 26. The limiter protrusions are arranged to extend inward in the disc tumbler cylinder lock. The key 1 comprises at least one recess 6 for the limiter protrusions.

The rotation limiting means further comprise a front guide 22, 57, the front guide having the rails 25, 48, 50 in association therewith. The front guide and the rails are arranged to allow turning of the key 1, presently in a basic position in a disc tumbler cylinder lock, for releasing the locking of the disc tumbler cylinder lock in such a way that the limiter protrusions 26 of both rails move, as the key is turned, into the at least one recess 6 of the key. The front guide features guiding surfaces 31A, 69, 70, which are arranged to control an inward movement of the rails in the disc tumbler cylinder lock upon turning of the key 1.

Figure 5:
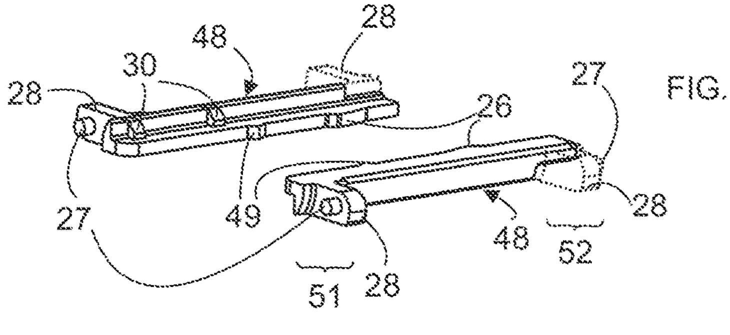
FIG. 5 shows various embodiments for rails of the rotation limiting means.
Figure 6:
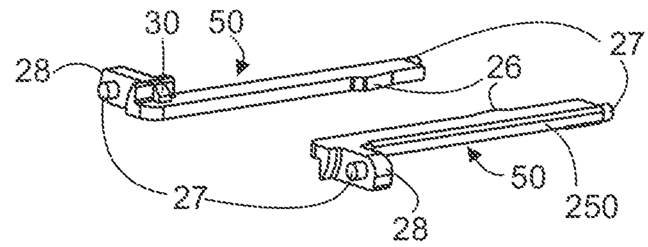
FIG. 6 shows an example for the rails of the rotation limiting means.

Hence, the rails 25, 48, 50, and the limiter protrusions 26 thereof, move inward in a disc tumbler cylinder lock, whereby a vacant space of the key channel is reduced, thus hindering manipulation. The rails move inwards as the key is turned for clearing a key code. Thus, the rails must move inwards to enable locking of the disc tumbler cylinder lock to be released. FIGS. 4, 5 and 6 depict exemplary embodiments for the rails. As can be noted from the examples, the rails 25, 48, 50 can be spaced apart from each other. In other words, there is no need for an intermediate yoke that would combine the rails for a single integral component.

The at least one recess 6 of the key can be a through-hole at a bottom of the key's grooves 5, as presented in FIG. 2. There may be several recesses depending on how many limiter protrusions 26, 49 are comprised in the rails 48. Depending on the embodiment, each groove 5 of the key 1 for said rails may thus have at least one the recess 6. The recess can also be designed to cover a more extensive area than being just on the groove bottom, a part of it being on a side or sides of the key shaft.

The effect of rails and limiter protrusions in terms of reducing the key channel's vacant space is particularly good when at least one limiter protrusion 26 of both rails 25, 48, 50 is arranged to extend to the other side of a split surface 102 of the disc tumbler cylinder lock's center axis 103. FIG. 3 illustrates this split surface. Hence, the split surface 102 divides the disc tumbler cylinder lock longitudinally, i.e. co-directionally with the center axis, into two parts. The limiter protrusion of both rails can also be positioned at a desired location along the rail, for example at a forward end 51, a central area, or a rearward end 52 of the rail.

Both rails 25, 48, 50 have an outer surface 250 outward from the disc tumbler cylinder lock. The outer surface can be arranged to lie at least partially against the disc tumbler cylinder's tumblers 11 in a basic condition of the disc tumbler cylinder lock. The disc tumbler cylinder lock's basic condition is a configuration, in which the key can be inserted into the key for releasing the locking. In the basic condition, the key can also be removed from the disc tumbler cylinder lock. Respectively, the basic position of the key 1 is such that the key has been inserted into the disc tumbler cylinder lock but has not been turned for releasing the locking. Thus, the basic condition of a disc tumbler cylinder lock is thus also a locking configuration in which the peripheral notches 19 of tumbler discs do not constitute a joint groove with the peripheral notches 20 of intermediate discs. Hence, the tumbler pin is not able to move inwards in the disc tumbler cylinder lock. Operation and embodiments for the rails' outer surface will be described later in this disclosure.

It is possible that at least one rail is provided with a wing 29, which is crosswise relative to the rail 25, 48. The wing 29 has its lengthwise axis co-directional with the rail. The wing has an outer surface 251 of the wing outward from the disc tumbler cylinder lock. The outer surface coincides with the rail's outer surface 250, and the outer surfaces are arranged to lie against the disc tumbler cylinder's tumblers 11 in the disc tumbler cylinder lock's basic condition. The wing 29 may have an inner surface 252 inward of the disc tumbler cylinder lock. The inner surface 252 may comprise at least one additional protrusion 30, in which case the key 1 has at least one additional recess 7 for the additional protrusion.

FIG. 4 shows an example of rotation limiting means, whose front guide 22 comprises two arcuate slots 31 for first ends 51 of the rails, and the disc tumbler cylinder lock's rearward end 91 is provided with other two arcuate slots 32 for second ends 52 of the rails. In the example of FIG. 4, the arcuate slots 32 of the disc tumbler cylinder lock's rearward end 91 are comprised in a separate rear guide 24 located at the rearward end, but the arcuate slots can also be formed directly in the disc tumbler cylinder lock's rearward end 91 as illustrated in FIG. 1 with dashed lines.

The rails in the example of FIG. 4 have both ends thereof provided with guiding protrusions 27 which are arranged to be in the respective arcuate slots 31, 32. The edges 31A, 32A of the arcuate slots constitute the guiding surfaces 31A for the front guide and guiding surfaces 32A for the rearward end 91. The guiding protrusions 27 are arranged to be at first ends 37, 39 of the respective arcuate slots 31, 32 in the disc tumbler cylinder lock's basic condition, and the guiding protrusions 27 are arranged to move, when the key1 is turned, to second ends 38, 40 of the guiding slots. When turning of the key 1 is continued, the disc tumbler cylinder lock is capable of resuming an open position.

The rear guide 24 comprises abutting faces 33, which are arranged against the disc tumbler cylinder lock's inner structure 9, whereby the rear guide 24 remains stationary when the key 1 is turned for decoding a key code, but rotates along with the inner structure as turning of the key 1 is continued after deciphering the key code. In the illustrated embodiment, the rear guide 24 comprises a sector protrusion 36 which comprises the abutting faces 33.

Figure 11:
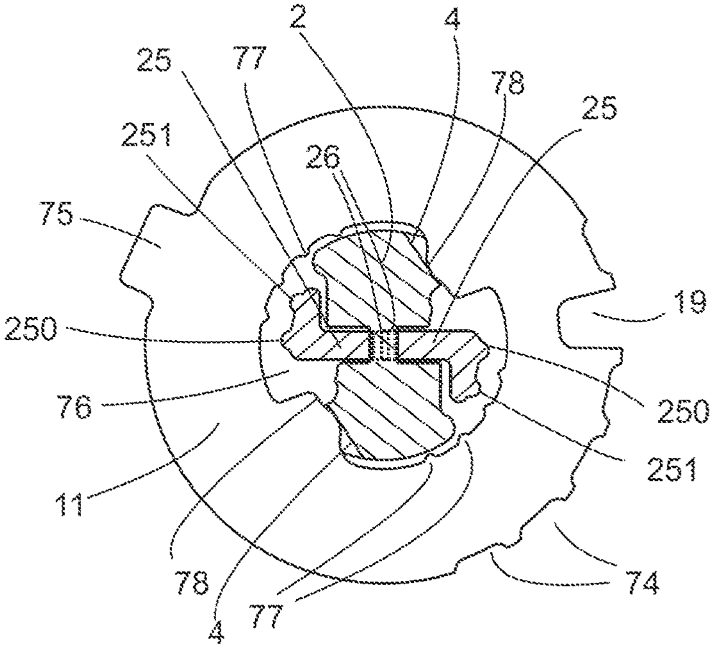
FIG. 11 shows an example for the rails of the rotation limiting means with respect to a tumbler after the key has been turned and the key code decoded.

In the embodiment of FIG. 4, the arcuate slots 31, 32 are arranged in such a way that the first end 37, 39 of each slot is further away from the disc tumbler cylinder lock's center axis 103 than the second end 38, 40 of each slot. In other words, the rails 25 have moved inwards in the disc tumbler cylinder lock and have reduced a vacant space in the key channel. FIG. 11 illustrates this situation. In FIG. 11, the key 2 has been turned in such a way that the key code is cleared. The key has its code cuts 4 against a counter-surface 78 comprised in a center hole 76 of the tumblers 11, and the tumblers' peripheral notches 19 constitute the already above-mentioned groove with the intermediate discs' peripheral notches 20. As the key is turned further, the disc tumbler cylinder lock's locking is releasable.

The wing's outer surface 251 and the rail's outer surface 250 are no longer against the edge of a tumbler's center hole 76. In this example, the rails' limiter protrusions 26 close the key channel at the center axis 103 by extending over to the other side of the lengthwise split surface 102 of the center axis.

With the key in its basic position and the disc tumbler cylinder lock in its basic condition, the outer surfaces 250, 251 of the rails are against an edge of the center hole 76 of the rails 11, thereby blocking rotation of the tumblers. This blocking effect can be enhanced by designing protrusions and/or recesses in the rails' outer surfaces and at the edges of the tumblers' center holes as presented in the example of FIG. 11. The center hole of a tumbler in FIG. 11 has its edge provided with protrusions 77 and the rails comprise protrusions/recesses. FIG. 11 illustrates also a motion limiter protrusion 75 at an outer edge of the tumbler 11, and peripheral pseudo-notches 74.

Figure 12:
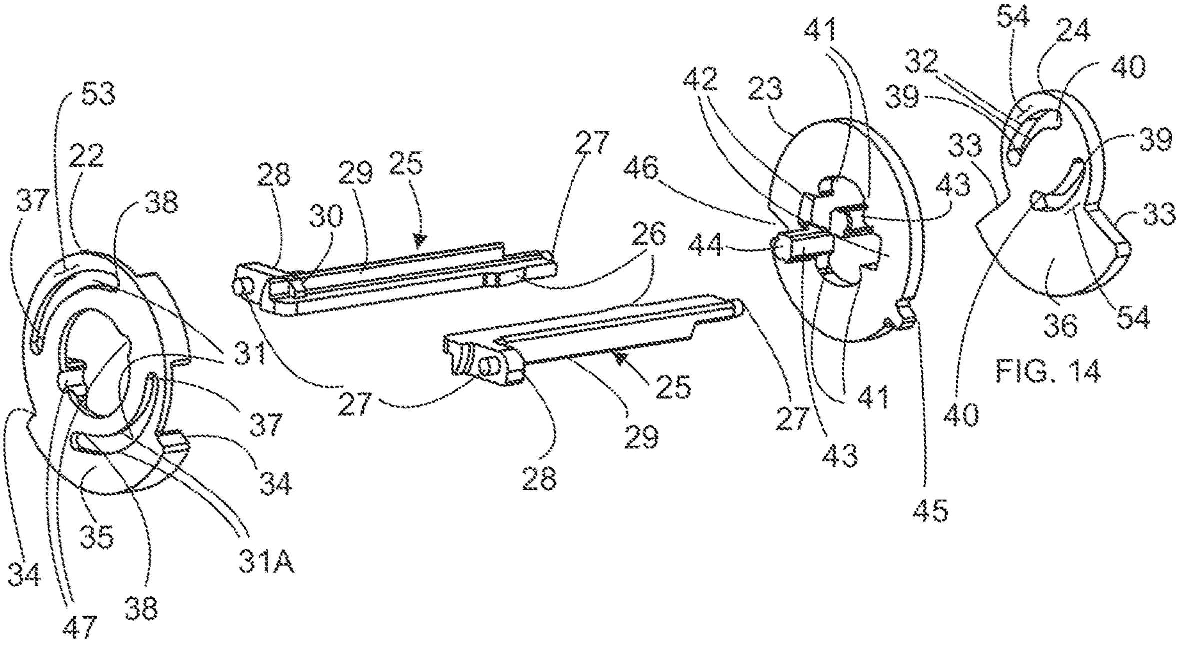
FIG. 12 shows another example of rotation limiting means for a disc tumbler cylinder lock of the invention.
Figure 13:
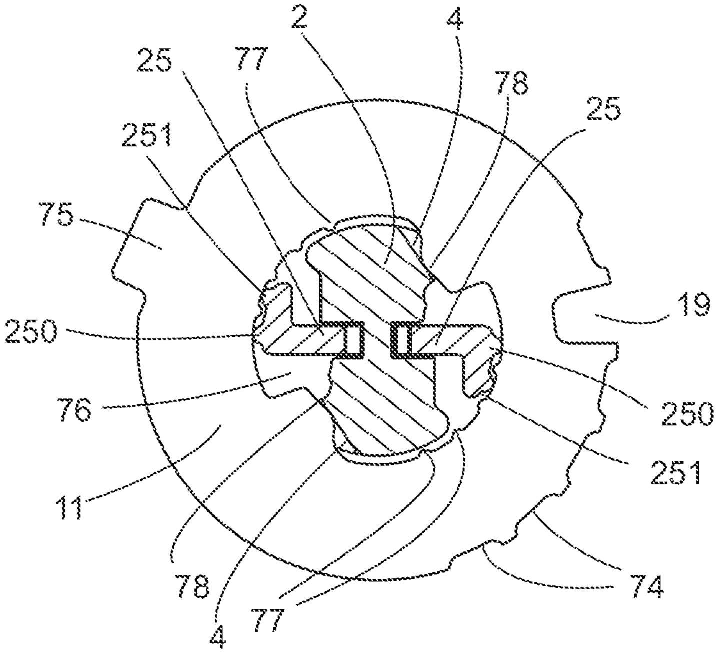
FIG. 13 shows another example for the rails of the rotation limiting means with respect to a tumbler after the key has been turned and the key code decoded.
Figure 14:
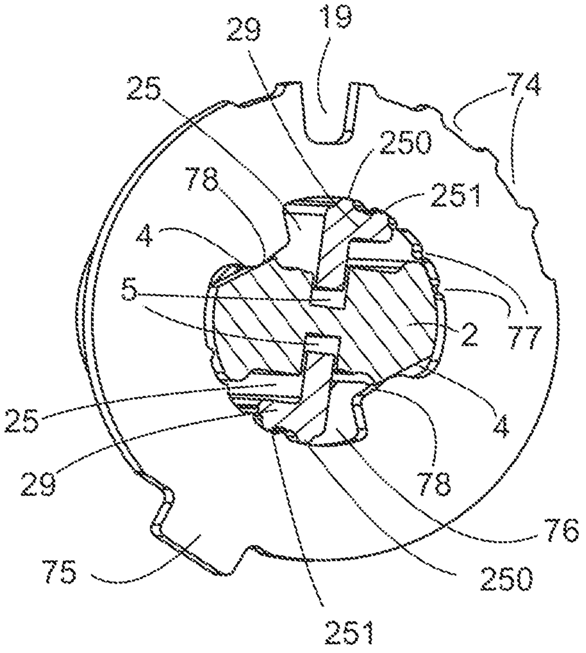
FIG. 14 shows the example of FIG. 13 from another angle.

FIG. 12 shows a second embodiment, wherein the arcuate slots 31, 32 are arranged in such a way that each slot has its first end 37, 39 and second end 38, 40 further away from the disc tumbler cylinder lock's center axis 103 than a location 53, 54 in the middle of each slot. Hence, in this case, when the key is turned for clearing a key code, the rails 25 move back away from the disc tumbler cylinder lock after the rails have made a visit inside the disc tumbler cylinder lock and identified a correct key. FIG. 13 depicts such a situation in the configuration after identification of the key code. Thus, the rails 25 are back in a position enabling rotation of the tumblers 11 to be blocked thereby as the outer surfaces 250, 251 of the rails are against the edge of the tumblers' center hole 76. This embodiment also comprises identification of a correct key. If the key is incompatible, the rails are not able to move inwards in the disc tumbler cylinder lock. FIG. 14 illustrates the situation in the example of FIG. 13 from another angle.

The front guide 22 in the embodiments of FIGS. 4 and 12 has a center hole 55 and abutting faces 34 of the front guide. The front guide's abutting faces are arranged against the inner structure 9 of a disc tumbler cylinder lock, whereby the front guide 22 remains stationary when the key 1 is turned for deciphering a key code, but rotates as the key is turned further after the key code has been deciphered. The front guide 22 may further comprise a support disc 23, which is connected rotatably to the rest of the front guide 22. The support disc 23 has a guiding center hole 56, provided with first guiding surfaces 41 for the key 1 and with abutting faces 42 of the support disc for the rails 25, 48, 50. The support disc's abutting faces provide support for the rails so as to maintain the same more firmly in a desired position, and also, for their part, control movement of the rails. The guiding surfaces 41 transmit, for their part, the turning of a key to the support disc and to the front guide.

The support disc 23 comprise attachment members 43, 44, by way of which the support disc 23 is attached rotatably to the rest of the front guide which is provided with mounting formations 47 for installing the support disc. In the illustrated embodiments, the mounting formations 47 are grooves, which enable the attachment members of the embodiments, i.e. an attachment protrusion 43 and an attachment plate 44 at its end, to settle against an edge of the front guide's center hole 55. Hence, the attachment plate 44 passes over the edge of the center hole and forms an engagement protrusion. The attachment plate and the engagement protrusion allow rotation of the support disc with respect to the rest of the front guide. The support disc 23 may comprise a peripheral notch 46 for the disc tumbler cylinder lock's tumbler pin 16, as well as a rotational motion limiter protrusion 45. The front guide 22 in the embodiments of FIGS. 4 and 12 may have its arcuate slots 31 in the form of through-slots. In addition, the front guide may comprise a sector portion 35 whose end surfaces constitute the front guide's abutting faces 34.

It can also be noted from the figures that at least the forward ends 51 of the rails are provided with an abutment member 28 outward from the disc tumbler cylinder lock, the abutting members 28 including the guiding protrusions 27. It is also possible to use abutment members 28 at the rails' rearward ends 52.

Figure 7:
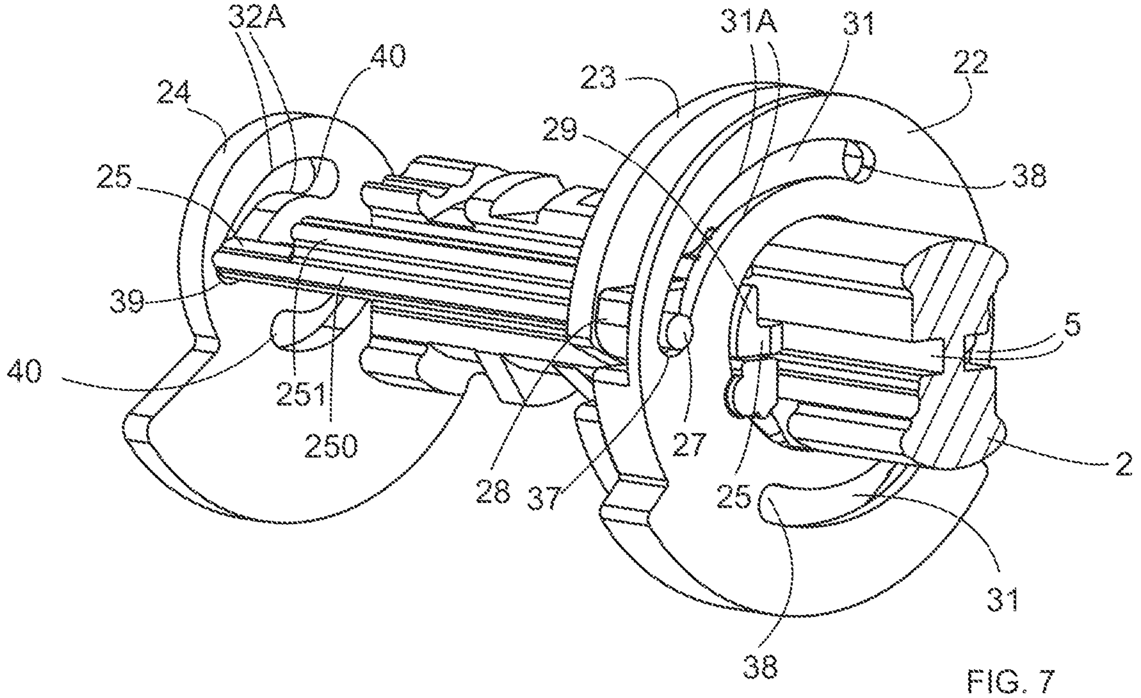
FIG. 7 shows a working example of rotation limiting means for a disc tumbler cylinder lock of the invention with the key partially inserted into the disc tumbler cylinder lock.

FIG. 7 shows an example, wherein the key shaft 2 is in the process of being inserted into a disc tumbler cylinder lock. It is for the sake of clarity that FIG. 7 only presents rotation limiting means. The figure shows in detail how the rails are partially in the grooves of a key 1 as the key is being inserted into a disc tumbler cylinder lock, and thereby control passage of the key. The ends of the rails 25 in this embodiment are by the intermediary of guiding protrusions 27 located at the first ends 37, 39 of the arcuate guiding slots 31, 31.

Figure 8:
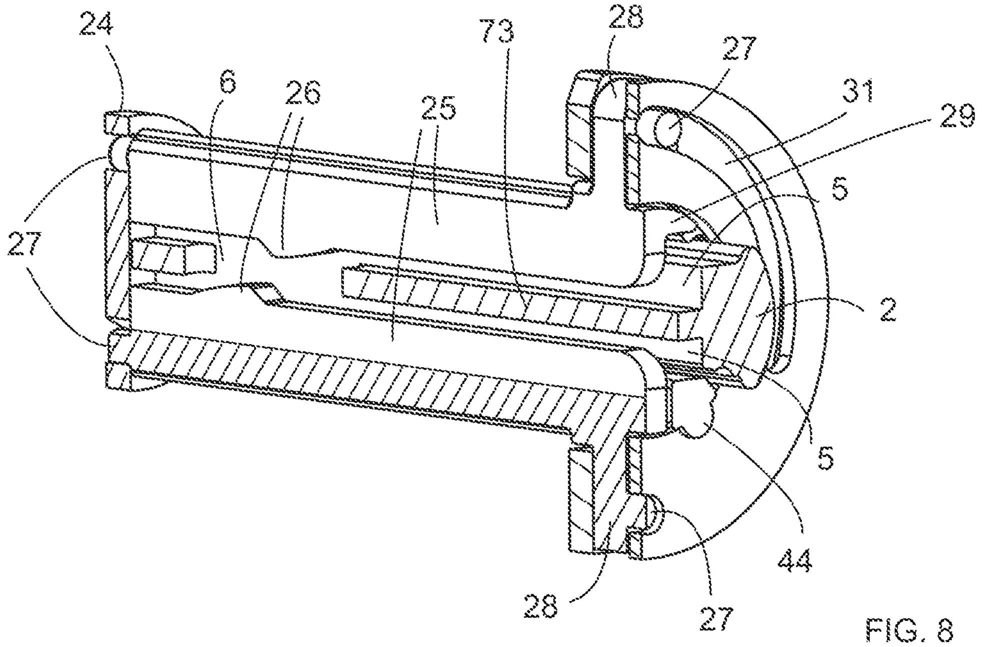
FIG. 8 shows a working example of rotation limiting means for a disc tumbler cylinder lock of the invention with the key in a basic position fully inserted into the disc tumbler cylinder lock.

FIG. 8 shows a section view example, in which the key has been fully inserted into a disc tumbler cylinder lock and they is in a basic position. It is for the sake of clarity that FIG. 8 only presents rotation limiting means, the same way as FIG. 7. FIG. 8 shows in clear detail how the depth of key grooves 5 is arranged to be such that there is space for the rails to move inwards in the disc tumbler cylinder lock as the key is turned for clearing a key code. The example has its key shaft 2 provided with a recess 6, which is a through-hole penetrating the key shaft. The example has its through-hole dimensioned in such a way that there is space for the limiter protrusions 26 of both rails to move into the through-hole 6 as the rails 25 move inwards upon turning the key. If there were no through-hole or recess, the rails would not be able to move inwards. In this case, the shapes of guiding slots, i.e. the slots' guiding surfaces 31A, 32A, prevent for their part the turning of a key because the slots would strive to move the rails inwards. Hence, the limiter protrusions are dimensioned so as to allow insertion of the key into the lock when the disc tumbler cylinder lock is in its basic condition. In this case, the tips of limiter protrusions may sweep along the bottoms of the key grooves 5 or can be very close to the bottoms of the grooves. From FIG. 8 can also be seen a central portion 73 of the key shaft 2, which constitutes a yoke between the grooves 5 of the key. Both sides of the yoke make up bottoms of the grooves.

Figure 9:
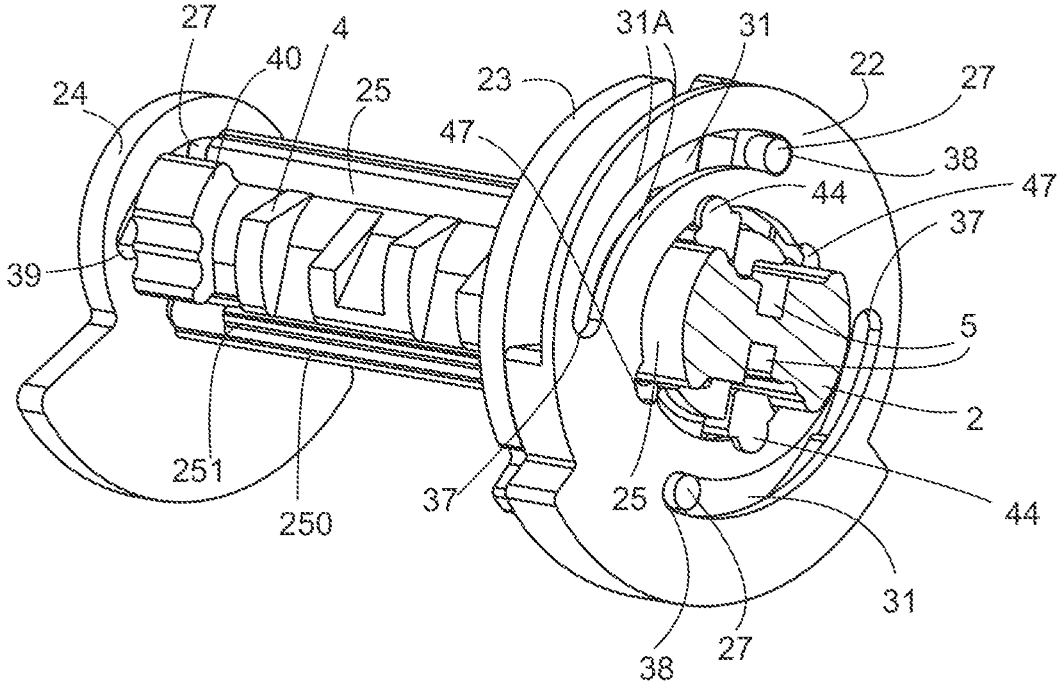
FIG. 9 shows a working example of rotation limiting means for a disc tumbler cylinder lock of the invention after the key has been turned in the disc tumbler cylinder lock.
Figure 10:
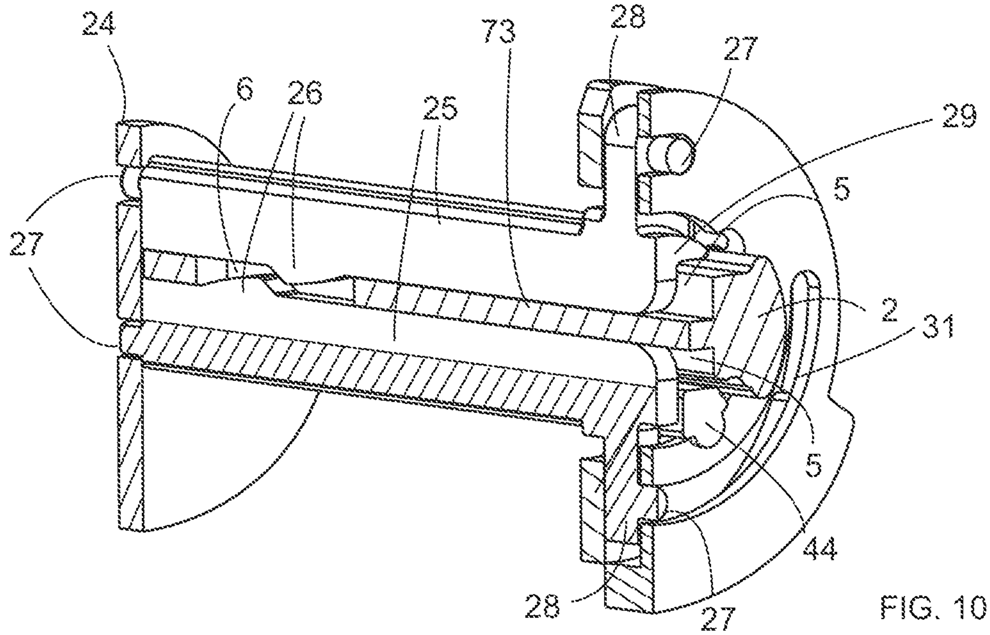
FIG. 10 shows the example of FIG. 9 in a section view.

FIG. 9 illustrates a situation, in which the key 1 has been turned in such a way that the guiding protrusions 27 at the ends of rails 25 have moved, being guided by the arcuate slots 31, 32, to the second ends 38, 40 of the slots. The key code has been cleared at this point. If turning of the key is continued, the disc tumbler lock shall be released. FIG. 10 depicts a section view example of the condition shown in FIG. 9. The limiter protrusions 26 have moved into the through-hole 6 and, at the same time, the rails 25 have moved inwards. The rails come into contact with the bottom of the grooves or find themselves very close to the bottoms of grooves 5. Hence, the recess/through-hole or the recesses of the key make it possible that the rails are able to move inwards in the disc tumbler cylinder lock under the guidance of the arcuate slots.

Figure 15:
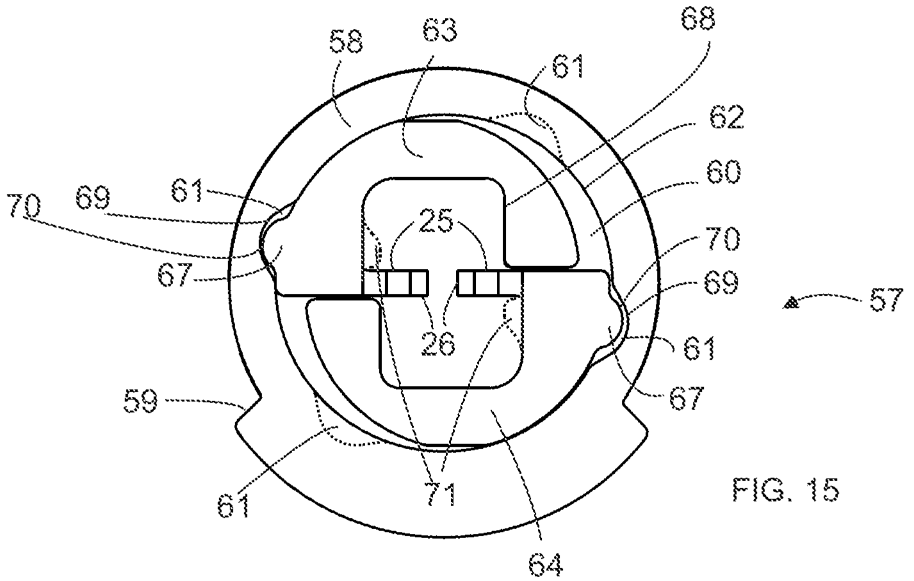
FIG. 15 shows still another example of rotation limiting means for a disc tumbler cylinder lock of the invention.
Figure 16:
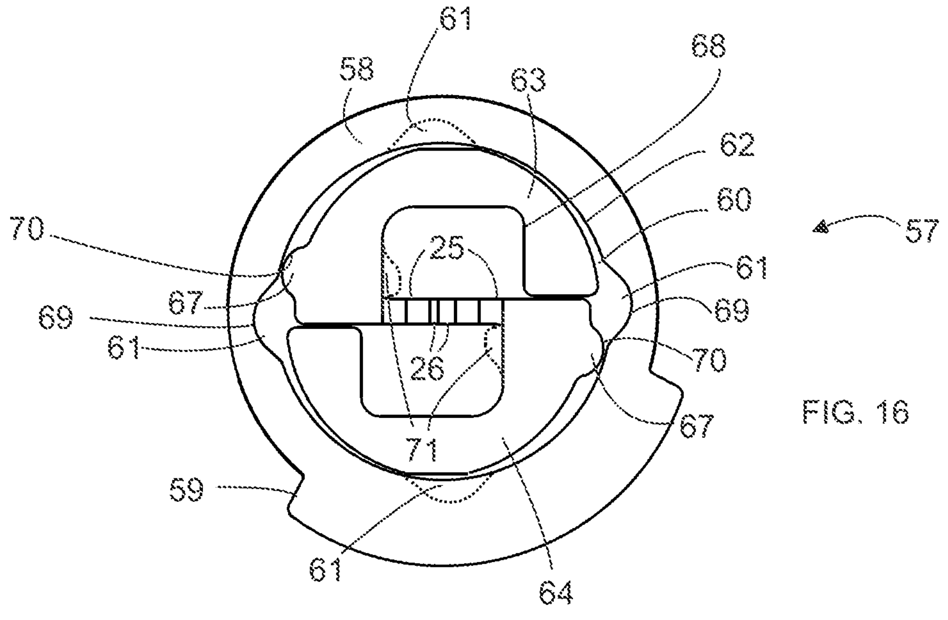
FIG. 16 shows the rotation limiting means of the example of FIG. 15 in another configuration.

FIGS. 15 and 16 show an example of another front guide embodiment 57. The front guide 7 has a frame disc 58, which comprises frame abutting faces 59, a center hole 60, and at least two recesses 61 at an edge 62 of the center hole. The frame abutting faces 59 are disposable against an inner structure 9 of the disc tumbler cylinder lock. The front guide 57 further comprises two limiter discs 63, 64, which are located in the frame disc's center hole 60 and connected to rails 25, 48, 50, 65, 66, one rail being connected to one limiter disc 63 and the other of the rails being connected to the other limiter disc 64. Both limiter discs are provided with an edge protrusion 67 which, in a basic position of the disc tumbler cylinder lock, is arranged to be in a given recess 61 of the frame disc. The limiter discs have an edge formation 68 for a key shaft 2. Thus, the edge formations of both limiter discs make up jointly a space for the key shaft 2. Edges 69 of the frame disc's recesses and edges 70 of the limiter discs' edge protrusions make up guiding surfaces already mentioned above.

When the key is turned from a basic position, the limiter discs will be guided inward by the guiding surfaces 69, 70, whereby the rails 25, integrally connected to the limiter discs, move also inwards. FIG. 16 depicts a situation in which the limiter discs and the rails have moved inwards. The key channel is closed in this example by the limiter protrusions 26 at the disc tumbler cylinder lock's center axis.

In addition, at least one of the limiter disc's edge formations 68 may have a protrusion 71, which is directed inwards in the disc tumbler cylinder lock. In this case, the key must have a recess for the protrusion in order to enable turning of the key in the disc tumbler cylinder lock. In the embodiments of FIGS. 5 and 6, the additional protrusion 30 or protrusions of the wing 29 correspond in a way to the protrusion 71 of FIGS. 15 and 16.

Thus, the additional protrusion 30, 71 or additional protrusions can be used for creating further coding on a key, since for each additional protrusion there must be a respective additional recess 7 in the key 1. This applies also to the number of limiter protrusions 26, 49 in the rails. For each limiter protrusion there must be a recess in the key. Various shapes of the additional protrusions 30, 71, limiter protrusions 26, 49, recesses 6, 7 and additional recesses cal also be used for providing more possibilities of compiling a key code.

Figure 17:
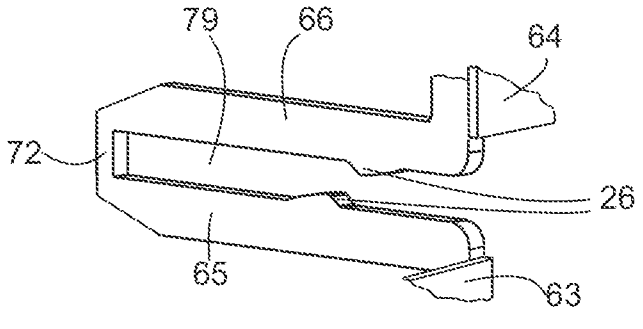
FIG. 17 shows still another example of rotation limiting means for a disc tumbler cylinder lock of the invention.

FIG. 17 shows still another embodiment for implementing rotation limiting means. In this embodiment, the rails 65, 66 are connected with a yoke 72 to each other by the ends of the rails. The other ends of the rails are connected to the limiter discs 63, 64. Between the rails is left a void 79, which is adequate for the rails 65, 66 to move inward under the guidance of the above-mentioned guiding surfaces as the key is turned. Hence, the structure of FIG. 17 possesses some elastic property, such that the rails are able to move inward. At the yoke 72, however, the rails are not able to move towards each other. It is also possible that, in the configuration of rails according to FIG. 17, one end of the rails is indeed not provided with limiter discs but instead with a front guide assembly of FIG. 4 or 12, whereby the ends of the rails, closer to the front guide, are in communication with the arcuate slots.

As already noted above, the manipulation of a disc tumbler cylinder lock is more troublesome with the rails 25, 65, 66, 48, 50 moving inward in the disc tumbler cylinder lock upon turning of the key. This reduces a void space in the key channel and thereby makes manipulation more difficult. The rails move inwards during a selection cycle, i.e. when the key is turned for clearing a key code. In order to enable the rails to move inward, the key must have a recess or recesses, which makes it possible to employ rotation limiting means also for compiling a key code. In addition, the outer surfaces of the rails can be utilized in such a way that the tumblers are not able to rotate in an undesired manner, thereby also making manipulation more difficult.

It is obvious that the invention is not limited to the examples presented in this disclosure, but the invention can be implemented with a multitude of various embodiments within the scope of the appended claims.

The invention claimed is:

1. A disc tumbler cylinder lock and key combination, wherein the disc tumbler cylinder lock comprises rotation limiting means for the key and a guiding element and the key comprises grooves for the guiding element, wherein the guiding element comprises two rails which form a part of said rotation limiting means, and both of said rails have at least one limiter protrusion, the limiter protrusions being arranged to facing inward in the disc tumbler cylinder lock, and the key comprises at least one recess for the limiter protrusions, and which rotation limiting means further comprise a front guide, the front guide being in connection with the rails, the front guide and the rails being arranged to allow the key, which is in a basic position in the disc tumbler cylinder lock, to be turned for releasing the locking of the disc tumbler cylinder lock in such a way that the limiter protrusions of both rails move, upon turning the key, into said at least one recess of the key.

2. The combination according to claim 1, wherein the rails are spaced apart from each other.

3. The combination according to claim 1, wherein the at least one recess of the key is a through-hole present in the bottom of the key's grooves.

4. The combination according to claim 1, wherein each groove of the key for said rails comprises at least one said recess.

5. The combination according to claim 1, wherein the at least one limiter protrusion of both rails is arranged to extend over onto the other side of a lengthwise split surface of the disc tumbler cylinder lock's center axis.

6. The combination according to claim 1, wherein both rails comprise an outer surface outward from the disc tumbler cylinder lock, said outer surface being arranged to be at least partially against tumblers of a disc tumbler cylinder in a basic condition of the disc tumbler cylinder lock.

7. The combination according to claim 6, wherein at least one rail comprises a wing, which is crosswise relative to the rail (25, 48) and which wing has its lengthwise axis co-directional with the rail, said wing having an outer surface (251) of the wing facing outward from the disc tumbler cylinder lock and coinciding with an outer surface of the rail, and the outer surfaces being arranged to be against the disc tumbler cylinder's tumblers in a basic condition of the disc tumbler cylinder lock.

8. The combination according to claim 7, wherein the wing comprises an inner surface facing inward of the disc tumbler cylinder lock, said inner surface including at least one additional protrusion and said key including at least one additional recess for the additional protrusion.

9. The combination according to claim 1, wherein the front guide has guiding surfaces, which are arranged to control a movement of the rails inward in the disc tumbler cylinder lock upon turning of the key.

10. The combination according to claim 9, wherein the front guide comprises two arcuate slots for first ends of the rails, and the disc tumbler cylinder lock has its rearward end provided with other two arcuate slots for second ends of the rails, both ends of said rails being provided with guiding protrusions, the guiding protrusions being arranged to be in the respective arcuate slots, with edges of said arcuate slots forming said guiding surfaces of the front guide and guiding surfaces of the rearward end, and the guiding protrusions being arranged to be at first ends of the respective arcuate slots in a basic condition of the disc tumbler cylinder lock, and the guiding protrusions being arranged to move, as the key is turned, to second ends of the guiding slots, whereby, upon continued turning of the key, the disc tumbler cylinder lock is movable to an open position.

11. The combination according to claim 10, wherein the arcuate slots are arranged in such a way that the first end of each slot is further away from the disc tumbler cylinder lock's center axis than the second end of each slot.

12. The combination according to claim 10, wherein the arcuate slots are arranged in such a way that the first end and the second end of each slot are further away from the disc tumbler cylinder lock's center axis than a location in the middle of each slot.

13. The combination according to claim 10, wherein the front guide comprises a center hole and abutting faces of the front guide, the abutting faces of the front guide being arranged against an inner structure of the disc tumbler cylinder lock, whereby the front guide remains stationary as the key is turned for decoding a key code but rotates as the key is turned further after the key code has been decoded.

14. The combination according to claim 13, wherein the front guide further comprises a support disc connected rotatably to the rest of the front guide, the support disc including a guiding center hole provided with first guiding surfaces (41) for the key and abutting faces of the support disc for the rails (25, 48, 50).

15. The combination according to claim 10, wherein at least forward ends of the rails are provided with an abutment member outward from the disc tumbler cylinder lock, the abutment members including at least some of said guiding protrusions.

16. The combination according to claim 15, wherein the support disc comprises attachment parts by way of which the support disc is attached rotatably to the rest of the front guide, and the front guide is provided with mounting formations for installing the support disc.

17. The combination according to claim 10, wherein the arcuate slots comprised in the front guide are through-slots.

18. The combination according to claim 10, wherein the support disc comprises a peripheral notch for a tumbler pin of the disc tumbler cylinder lock.

19. The combination according to claim 10, wherein the disc tumbler cylinder lock's rearward end comprises a rear guide, which comprises other two arcuate slots.

20. The combination according to claim 19, wherein the rear guide comprises abutting faces, the abutting faces being arranged against an inner structure of the disc tumbler cylinder lock, whereby the rear guide remains stationary as the key is turned for decoding a key code but rotates as the key is turned further after the key code has been decoded.

21. The combination according to claim 20, wherein the rear guide comprises a sector protrusion, which comprises the abutting faces.

22. The combination according to claim 20, wherein at least one of the limiter disc's edge formations has a protrusion, which is directed inwards in the disc tumbler cylinder lock.

23. The combination according to claim 9, wherein the front guide has a frame disc, which comprises frame abutting faces, a center hole and at least two recesses at an edge of the center hole, the frame abutting faces being arranged against an inner structure of the disc tumbler cylinder lock, and the front guide further comprising two limiter discs, which are located in the frame disc's center hole and connected to rails, one rail being connected to one limiter disc and the other of the rails being connected to the other limiter disc, both of said limiter discs being provided with an edge protrusion which, in a basic position of the disc tumbler cylinder lock, is arranged to be in a given recess of the frame disc, and said limiter discs having an edge formation for a key shaft, the edges of the frame disc's recesses and edges of the limiter discs' edge protrusions forming said guiding surfaces.

* * * * *